United States Patent [19]

Chattha

[11] 4,384,103

[45] May 17, 1983

[54] HIGH SOLIDS URETHANE COATINGS I

[75] Inventor: Mohinder S. Chattha, Livonia, Mich.

[73] Assignee: Ford Motor Company, Dearborn, Mich.

[21] Appl. No.: 334,686

[22] Filed: Dec. 28, 1981

[51] Int. Cl.$^3$ .................. C08G 18/32; C08G 18/34
[52] U.S. Cl. .................. 528/83; 525/440; 528/80; 528/81
[58] Field of Search .................. 528/80, 81, 83; 525/440

[56] References Cited

U.S. PATENT DOCUMENTS

| | | | |
|---|---|---|---|
| 2,460,186 | 1/1949 | Moffett | 524/285 |
| 3,404,018 | 10/1968 | Hicks | 528/81 |
| 3,544,656 | 12/1970 | Hornung et al. | 525/443 |
| 3,553,284 | 1/1971 | Reimhofer et al. | 525/519 |
| 3,668,275 | 6/1972 | Reimhofer et al. | 525/443 |
| 3,678,128 | 7/1972 | Reimhofer et al. | 525/443 |
| 3,847,874 | 11/1974 | Murakami et al. | 528/80 |
| 3,976,622 | 8/1976 | Wagner et al. | 528/49 |
| 4,025,474 | 5/1977 | Porter et al. | 525/161 |
| 4,028,309 | 6/1977 | Fang | 528/80 |
| 4,181,784 | 1/1980 | Chattha et al. | 525/161 |
| 4,279,800 | 7/1981 | Boomgaard et al. | 528/83 |
| 4,322,508 | 3/1982 | Peng et al. | 528/81 |

*Primary Examiner*—H. S. Cockeram
*Attorney, Agent, or Firm*—Lorraine S. Melotik; Roger L. May

[57] ABSTRACT

A novel polyhydroxy oligomer crosslinkable with polyisocyanates to form a coating composition adapted for use as an automotive topcoat which upon curing forms a hard, glossy, durable coating with outstanding durability and excellent resistance to solvents and water. The coating composition comprises:

(A) a polyhydroxy oligomer having a number average ($M_n$) molecular weight of between about 250–2000 and being the reaction product of:
  (i) an ester having pendant hydroxyl and carboxyl functionality and being made by reacting
    (a) a $C_3$–$C_{10}$ aliphatic branched diol, and
    (b) an alkyl hexahydrophthalic anhydride; and
  (ii) a $C_2$–$C_{10}$ monomer, having reactive functionality capable of esterifying said carboxyl functionality of said ester;
(B) a polyisocyanate crosslinking agent having two or more reactive isocyanate groups per molecule; and
(C) 0–50 weight percent based on the total weight of (A), (B) and (C) of a hydroxy functional additive having a number average weight ($M_n$) of between about 150–6000.

33 Claims, No Drawings

HIGH SOLIDS URETHANE COATINGS I

Reference is made to commonly assigned and concurrently filed U.S. application Ser. Nos. 334,686 entitled "New Polyhydroxy Oligomers for High Solids Coatings I", 334,801 entitled "New Polyhydroxy Oligomers for High Solids Coating II", 334,800 entitled "High Solids Coatings from New Tetrahydroxy Oligomers", 334,802 entitled "New High Solids Urethane Coatings II" and 334,799 entitled "High Solids Urethane Coatings from New Tetrahydroxy Oligomers", all to Chattha.

This invention relates to novel coating compositions. More particularly, the invention relates to high solids thermosetting coating compositions which are adapted to provide an automotive topcoat demonstrating hardness, high gloss, outstanding durability and excellent resistance to solvents and water, and which comprises novel polyhydroxy, preferably dihydroxy, oligomers crosslinkable with polyisocyanates. Most particularly, this invention relates to low viscosity high solids level compositions having superior weathering properties wherein the novel polyhydroxy oligomers are made by first reacting a low molecular weight branched diol with an alkyl hexahydrophthalic anhydride to form a hydroxy acid ester. This hydroxy carboxy ester is further reacted with a $C_2-C_{10}$ monomer having reactive functionality capable of esterifying the carboxyl functionality of the hydroxy acid ester. Additionally, by means of this esterification reaction, the monomer adds hydroxyl functionality to the reaction product.

BACKGROUND OF THE INVENTION

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance.

The coating compositions of this invention combine the above discussed desired properties and low application viscosity so as to overcome deficiencies of previously proposed high solids materials. In particular, these high solids coating compositions exhibit excellent weathering properties making them ideally suitable for automotive topcoats, clear or pigmented, including metallic flake.

BRIEF DESCRIPTION OF THE INVENTION

The low viscosity thermosetting coating composition of this invention preferably contains greater than about 60% by weight, more preferably greater than 70% by weight, of nonvolatile solids, and exhibits superior weathering.

The composition comprises:
(A) A polyhydroxy oligomer having a number average ($\overline{M}_n$) molecular weight of between about 250–2000 and being the reaction product of:
 (i) an ester having pendant hydroxyl and carboxyl functionality and being made by reacting:
  (a) a $C_3-C_{10}$ aliphatic branched diol, and
  (b) an alkyl hexahydrophthalic anhydride, wherein (a) and (b) are combined in the reaction mixture in an amount sufficient to allow reaction in about a 1:1 molar ratio, and
 (ii) a $C_2-C_{10}$ monomer having a reactive functionality capable of esterifying the carboxyl functionality of the ester. This $C_2-C_{10}$ monomer adds hydroxyl functionality either directly or indirectly to the reaction product and is selected from the group consisting of:
  (a) a monomer wherein said reactive functionality reacts with said carboxyl functionality to form an hydroxyl in addition to an ester linkage,
  (b) a monomer bearing hydroxyl functionality in addition to said reactive functionality and wherein said reactive functionality does not generate a hydroxyl in addition to an ester linkage, and
  (c) a monomer bearing hydroxyl functionality in addition to said reactive functionality and wherein said reactive functionality reacts with said carboxyl functionality to form a hydroxyl in addition to an ester linkage,
 wherein the ester and the $C_2-C_{10}$ monomers are in the reactant mixture in an amount to allow reaction in about a 1:1 molar ratio;
(B) polyisocyanate crosslinking agent having two or more reactive isocyanate groups per molecule and,
(C) 0–50 weight percent based on the total weight of (A), (B), and (C) of a hydroxy functional additive having a number average molecular weight ($\overline{M}_n$) of between about 150–6000, preferably between about 500–2500.

The polyisocyanate crosslinking agent is included in the composition in an amount sufficient to provide between about 0.50, preferably between about 0.80 and 1.3, reactive isocyanate groups per hydroxyl group included in the composition either on the polyhydroxy oligomer or as a hydroxyl group of the hydroxy functional additive. The oligomers of this composition are compatible, in particular, with low molecular weight hydroxy functional acrylics. In addition, the coating composition of this invention may include conventional additives such as catalysts, antioxidants, U.V. absorbers, flow control or wetting agents, antistatic agents, pigments, plasticizers, solvents, etc. The oligomers of this composition are also compatible with nonaqueous dispersions (NAD's), which are generally used as flow control additives.

The preferred oligomer is a dihydroxy oligomer produced by an ester monomer reaction which adds only one additional hydroxyl group to the oligomer (i.e., the hydroxyl functionality is either present on the $C_2-C_{10}$ monomer initially or generated as a result of the monomer-ester reaction).

DETAILED DESCRIPTION OF THE INVENTION

The low viscosity high solids coating composition of this invention provide a system which is particularly suitable for those applications requiring a coating having good weatherability, high gloss, hardness, durability and high solvent and water resistance as well as low temperature cure. The desirable characteristics of the low viscosity coating composition of this invention, in particular the excellent physical properties and weatherability, are believed to result from the steric hinderance to hydrolysis afforded the ester groups of the oligomer by the alkyl group of the anhydride. However, while this theory has been advanced to explain the excellent durability of this coating composition, neither its validity nor its understanding is necessary for the practice of the invention.

Each of the components of the coating composition, the amounts of each of the components required to achieve the desired results of the invention and a method for applying the composition are described hereinafter in greater detail.

POLYHYDROXY OLIGOMERS

A principal material in the coating of this invention is a novel polyhydroxy oligomer having a number average ($\overline{M}_n$) molecular weight between about 250 and about 2000, more preferably between about 400 and about 1500. The oligomer is prepared by first combining a low molecular weight $C_3$–$C_{10}$ aliphatic branched diol with an alkyl hexahydrophthatic anhydride in a reactant mixture in an amount sufficient to allow reaction in about a 1:1 molar ratio so as to form an ester having pendant hydroxyl and carboxyl functionality. This ester is further reacted with a $C_2$–$C_{10}$ monomer bearing reactive functionality capable of esterifying the carboxyl functionality of the ester and forming the polyhydroxy oligomer, using suitable catalysts, if desired. The monomer is suitably chosen so that, in addition to the esterification of the carboxyl functionality by means of this reaction, pendant hydroxyl functionality is also incorporated on the oligomer, i.e., this hydroxyl functionality was either present initially on the monomer (exclusive of the reactive functionality), as for example when reacting a diol monomer or generated by this reaction, as is the case, for example, when the monomer used is an epoxy, or both initially present and reaction generated as when the monomer contains both epoxide and hydroxyl functionality. The adduct and the monomer are combined in the reactant mixture in an amount sufficient to allow reaction in about a 1:1 molar ratio.

The $C_3$–$C_{10}$ aliphatic branched diol used in preparing oligomers useful in compositions of this invention preferably contains only one primary hydroxyl group, the second hydroxyl of the diol is therefore preferably a secondary or tertiary hydroxyl, preferably a secondary hydroxyl. Additionally it is preferable that the hydroxyl groups not be on adjacent carbons and more preferably be separated by at least three carbon atoms. The carbon chain may also be interrupted or substituted by non-interfering functionality. Suitable $C_3$–$C_{10}$ aliphatic branched diols include, but are not limited to, 2-ethyl-1,3- hexane diol, 1,3-butane diol, 1,2-butane diol and 1,2-propane diol, with 2-ethyl-1,3-hexane diol being most preferred. The choice of other suitable diols would be within the skill of one in the art. Mixtures of suitable diols can also be used.

The alkyl hexahydrophthalic anhydride preferably contains a lower alkyl group, i.e., an alkyl group having up to about seven carbon, more preferably up to about four carbons. Additionally, the alkyl group may be substituted by non-interfering functionality. Suitable anhydrides useful in this invention include methyl hexahydrophthalic anhydride, and its ethyl and propyl analogs, with methyl hexahydrophthalic anhydride being most preferred.

Suitable $C_2$–$C_{10}$ monomers useful in this invention include, but are not limited to, branched diols, such as those described above, monoepoxides whose carbon chain may be interrupted by oxygen or contain non-interfering functionality such as hydroxyl, and glycidyl ethers and glycidyl esters. Examples of these monomers which may be used include alkylene oxides such as ethylene oxide, propylene oxide, 2,3-butylene oxide, and 1,2-epoxy decane, styrene oxide, cyclohexene oxide, butyl glycidyl ether, glycidol acetate, and glycidol. Since the preferred oligomer contains two hydroxyl groups, (i.e., is a dihydroxy oligomer), the reaction of the hydroxy carboxy ester with the monomer preferably incorporates only one additional hydroxy functionality on the oligomer (i.e., in addition to that already present on the hydroxy carboxy ester as a result of the branched diol anhydride reaction). Therefore, the preferred monomers are selected from diols, nonfunctional monoepoxides and glycidyl ethers and glycidyl esters wherein the glycidyl functionality is the only reactive functionality (in the case of monoepoxides, glycidyl ethers and glycidyl esters, i.e., containing no hydroxy functionality).

As will be apparent to one skilled in the art, suitable mixtures of these monomers could also be used. In order to achieve the preferred high solids composition of the subject invention, it is preferable to use highly branched monomers, in particular branched diols, and most particularly 2-ethyl-1, 3-hexane diol.

In preparing the dihydroxy oligomers, the branched diol (a) and the anhydride (b) are combined and reacted at an elevated temperature and for a time necessary to form the hydroxy acid ester. Subsequently, the monomer (ii) is reacted with the ester, generally in the presence of a catalyst and at an elevated temperature, until the esterification of the carboxyl functionality of the ester is complete.

In one embodiment of this invention, wherein the same diol is used as the branched diol (a) and the reactive $C_2$–$C_{10}$ monomer (ii), the diol can be combined with the anhydride in about a 2:1 molar ratio and the two stage reaction carried out. After the first reaction is complete, wherein the hydroxy acid ester is formed, a catalyst is generally added to initiate the esterification of the carboxyl of the hydroxy acid ester. The carboxyl functionality reacts with one of the hydroxyls of the diol to form an ester leaving the second hydroxyl intact. The water produced by this condensation reaction is removed. In another embodiment, wherein for example, the $C_2$–$C_{10}$ monomer is a monoepoxide, the branched diol (a) and the anhydride (b) are first combined and reacted in about a 1:1 molar ratio. Subsequently, the monoepoxide is added to the reaction product hydroxy carboxy ester to form the hydroxy oligomer. In this second reaction step, the carboxyl of the ester opens the epoxide ring and generates a hydroxyl group.

Suitable catalysts for the esterification of the carboxyl functionality are well known in the art. Catalysts known to catalyze the carboxy/epoxy reaction include tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalysts include: metal halides such as chromium trichloride, ferric trichloride, and aluminum trichloride; mercaptans and thioethers such as octyl mercaptan, dimercapto propanol and dimercaptodiethyl ether; tertiary amines such as triethyl amine, pyridine, dimethylamine, quinoline, β-picoline, ethylpyridine; and the like. Suitable catalysts useful for the carboxy/hydroxy (diol) condensation reaction include such catalysts as tetraisopropyl titanate, strong acids such as p-toluene sulfonic acid, phosphoric acid, sulfuric acid and materials such as zinc oxide, antimony oxide (Sb$_2$O$_3$) and sodium acetate. Other catalyst will be apparent to those skilled in the art.

Although the above reactions may be carried out with or without solvents, it is generally suitable and preferable, in order to achieve the preferred high solids level of the coating composition, to use little or no solvent. However, when desirable, suitable solvents which may be employed include those commonly used, such as toluene, xylene, methyl amyl ketone, etc.

Various mixtures of these types of oligomers may also be employed within the scope of the compositions of the invention described herein.

POLYISOCYANATE CROSSLINKING AGENT

The other major component of the thermosetting, coating composition of the invention is a polyisocyanate, i.e., a compound having 2 or more, preferably 3 or more, reactive isocyanate groups per molecule. This polyisocyanate crosslinking agent is included in the compositions of the invention in an amount sufficient to provide between about 0.5 and about 1.6 preferably between about 0.8 and about 1.3, reactive isocyanate groups per hydroxy group in the composition. Most preferably the crosslinking agent is included in an amount sufficient to provide about 1.1 isocyanate groups per hydroxyl group in the composition.

Polyisocyanates are well known in the art and numerous suitable isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which may be employed are (1) aliphatic diisocyanates such as trimethylene diisocyanate, tetramethylene diisocyanate, pentamethylene diisocyanate, hexamethylene diisocyanate, 1,2 propylene diisocyanate, 1,2 butylene diisocyanate, 2,3 butylene diisocyanate, 1,3 butylene diisocyanate, ethylidene diisocyanate, butylidene diisocyanate, 4,4'bis(isocyanate hexyl) methane, bis(2-isocyanate-ethyl) fumarate, 2,6-diisocyanate methyl caproate, 2,2,4(2,4,4)-trimethylhexamethylene diisocyanate, and dimer acid diisocyanates; (2) cycloaliphatic diisocyanates such as 1,3 cyclopentane diisocyanate, 1,4 cyclopentane diisocyanate, 1,2 cyclopentane diisocyanate, and methylcyclohexylene diisocyanate; (3) aromatic diisocyanates such as m-phenylene diisocyanate, p-phenylenediisocyanate, 4,4'diphenyl diisocyanate, 1,5 methylene diisocyanate, 1,4 napthalene diisocyanate; (4) aliphatic/aromatic diisocyanates such as 4,4'diphenylenemethane diisocyanates, 2,4 or 2,6 toluene diisocyanate 4,4'toluidene diisocyanate, 1,4 xylylene diisocyanate; (5) nuclear substituted aromatic compounds such as dianisidine diisocyanate, 4,4'diphenylether diisocyanate, chlorodiphenylene diisocyanate; (6) triisocyanates such as triphenylmethane 4,4', 4,4" triisocyanate, 1,3,5 triisocyanate benzene, 2,4,6 triisocyanate toluene; (7) tetraisocyanates such as 4,4' diphenyl dimethylmethane 2,2',5,5' tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glycols (e.g., ethylene glycol, propylene glycol), other polyols such as glycerol, trimethylol propane, hexane triol, pentaerythritol and the like, as well as monoethers, e.g. diethylene glycol, tripropylene glycol and the like and polyethers, i.e., alkylene oxide condensates of the above.

Especially preferred for use in the compositions of the invention are trimerized products of aliphatic diisocyanates such as 1,6 hexamethylene diisocyanate. Still another particularly preferred type of crosslinking agent is a polyisocyanate having a biuret structure. This type of polyisocyanate is well known as are methods for making the same. One such polyisocyanate crosslinking agent is a high molecular weight biuret of 1,6 hexamethylene diisocyanate sold by Mobay Chemical Company under the tradename Desmodur N. Exemplary of other biuret type polyisocyanates are those prepared in accordance with U.S. Pat. No. 3,976,622 to Wagner et al.

Optional Hydroxy Functional Additive

Additional hydroxyl functionality other than that present on the polyhydroxy oligomer may be achieved by adding a hydroxy functional additive in amounts up to about 50 weight percent based on the total of the two above discussed components and the hydroxy functional additive itself. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful in the invention preferably are selected from the group consisting of: (i) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one of which bears hydroxy functionality and which is included in the copolymer in an amount ranging from about 10 to about 50 weight percent, and (vi) mixtures of (i)–(v).

U.S. Pat. No. 4,181,784 to Chattha et al teaches a high solids paint composition comprising an optional hydroxy functional additive. This patent is hereby expressly incorporated by reference as detailing hydroxy functional additives representative of those which are suitable for use as such in the composition of this invention. These hydroxy functional materials include hydroxy functional polyesters, hydroxy functional polyethers, hydroxy functional oligomers, monomeric polyols and hydroxy bearing copolymers.

The hydroxy functional polyesters useful in the invention are preferably fully saturated products prepared from aliphatic dibasic acids containing 2–20 carbon atoms, and short chain glycols of up to and including 21 carbon atoms. The molecular weight of these materials ranges from about 200 to about 2500 and the hydroxyl number ranges from about 30 to about 230.

Among preferred polyesters are products derived from esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

Oligoester (i) is prepared by reacting a dibasic carboxylic acid with a monoepoxide, preferably include those formed by reacting $C_6$–$C_{12}$ dicarboxylic aliphatic acids with ethylene oxide or propylene oxide.

The preparation of oligoesters from carboxylic acids and polyepoxides is well known and is described, for example, in U.S. Pat. Nos. 2,456,408 and 2,653,141. Numerous hydroxy functional oligoesters within this general category will be apparent to those skilled in the art. The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed from monoethylenically unsaturated monomers, with between about 10 and about 50 weight percent bearing hydroxyl functionality.

Although one of ordinary skill in the art will recognize that many different hydroxy bearing monomers could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the hydroxy functional copolymer, i.e., between about 90 and about 50 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Other Materials

In addition to the above discussed components, other materials may be included in the coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyethyl ketone, acetone, 2-ethoxy-1-ethanol, 2-butoxyl-1-ethanol, diacetone alcohol, tetrahydrofuran, ethylacetate, dimethylsuccinate, dimethylglutarate, dimethyladipate or mixtures thereof. The solvent in which the polyhydroxy functional oligomer of the coating composition is prepared, may be employed as the solvent for the coating composition thus eliminating the need for drying the oligomer after preparation, if such is desired. As mentioned above, the nonvolatile solids content of the high solids coating composition is preferably at least 60%, and more preferably 70% or more, thus limiting the amount of solvent included in the composition. The subject paint composition may comprise 100% solids thereby including no solvent. However, while the polyhydroxy oligomers of the subject invention are particularly suitable for making high solids coatings, they are also suitable for use in compositions that are not high solids compositions. Determination of optimal solids content for a given application would be within the skill of one in the art.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicone oils or mixture thereof. Of course, the choice of surface modifiers or wetting agent is dependent upon the type of surface to be coated and selection of the same is clearly within the skill of the artisan.

The coating composition of the invention also may include pigments. As noted above, the coating compositions of this invention may include metallic flake as a pigment. The amount of pigment in the coating composition may vary, but preferably is between about 3 and about 45 weight percent based on the total weight of the paint composition. If the pigment is metallic flake, the amount ranges from about 1 to about 20 weight percent.

Application Techniques

The coating composition can be applied by conventional methods known to those in the art. These methods include roller coating, spray coating, dipping or brushing and, of course, the particular application technique chosen will depend on the particular substrate to be coated, the environment in which the coating operation is to take place, the pot life of the composition.

A particularly preferred technique for applying the high solids coating compositions, particularly when applying the same to automobiles as topcoats, is spray coating through the nozzle of a spray gun. In accordance with this preferred technique, the polyhydroxy oligomer and the optional hydroxy functional copolymer along with other additives such as pigments, U.V. absorbers antioxidants and other nonreactive materials are admixed with solvent. These materials are fed as one component of a two component system into a spray gun which combines the materials as they are sprayed onto the automotive substrate. The other material is the polyisocyanate crosslinking agent, which may or may not be cut with a suitable nonreactive solvent.

High solids paints have in the past caused some difficulty in spray coating techniques because of the high viscosity of the materials and resultant problems in clogging of spray guns. However, because the compositions of this invention demonstrate relatively low viscosity considering the high solids content they can be applied by spray coating techniques.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

Methylhexahydrophthalic anhydride (1260 g), 2-ethyl-1,3-hexanediol (2190 g) and xylene (350 g) are placed in a round bottom flask and the reaction mixture is heated at 70° C. for 16 hours. Four grams of tetraisopropyl titanate (Tyzor TPT, E. I. du Pont de Nemours and Co.) are added to the reaction flask and it is fitted with a Dean-Stark water separator. The reaction mixture is heated at 200° C. and water is continuously collected until no more water separates (12 hours). Part of the xylene (197 g) is distilled off. The molecular weight of the resulting product from gel permeation chromatography with propylene glycol as standard, is found to be $\overline{M}_n = 462$, $\overline{M}_w = 517$.

Fifty-one (51) parts of the above oligomer and 0.5 part of dibutyltin dilaurate are dissolved in 28 parts of n-butyl acetate. A solution of 48 parts of Desmodur N-100 (Mobay Chemical Co.) in 17 parts of n-butyl acetate is added to the above solution and the resulting formulation is applied by spraying to primed steel panels. The panels are baked at 105° C. for 17 minutes to obtain coatings with excellent physical properties.

EXAMPLE 2

Methylhexahydrophthalic anhydride (252 g) and 2-ethyl-1,3-hexanediol (219 g) are placed in a round bottom flask and stirred at 70° C. for 15 hours. Cordova Accelerator AMC ™-2 (2.6 g) (Cordova Chemical Company) is added to the reaction mixture followed by dropwise addition of 125 g propylene oxide, the reaction mixture was stirred at 100° C. for five hours under a cold water condenser. Excess propylene oxide was evaporated under reduced pressure.

Forty-two (42) parts of the above oligomer and 0.4 parts of dibutyltin dilaurate are dissolved in 23 parts of n-butyl acetate. A solution of 25 parts of Desmodur-N-150 (Mobay Chemical Co.) in 14 parts of n-butyl acetate is added to the above solution and the resulting formulation is applied by spraying to primed steel panels. The panels are baked at 110° C. for 18 minutes to obtain coatings with excellent hardness, adhesion, gloss and solvent resistance.

EXAMPLE 3

Five parts of aluminum flakes (65% in naphtha) and six parts of nonaqueous dispersed acrylic polymer (42% solids by weight prepared as described in Example A of U.S. Pat. No. 4,025,474 are included in oligomer solution described in Example 1. A solution of 49 parts of Desmodur-N-100 (Mobay Chemical Co.) in 18 parts of n-butyl acetate is added to the above mixture and the resulting formulation is applied by spraying to primed steel panels. The panels are baked at 105° C. for 19 minutes to obtain silver metallic coatings with excellent hardness, adhesion and solvent resistance.

EXAMPLE 4

Ninety-five (95) parts of the oligomer described in Example 1 are dissolved in 70 parts of methyl amyl ketone and 392 parts of titanium dioxide are added under agitation to this solution. The resulting mixture is whipped with a Cowl's blade at 80 cycles per second for one hour.

Sixty (60) parts of the above millbase, 35 parts of the oligomer from Example 2 are mixed with 0.45 parts of dibutyltin dilaurate and 23 parts of n-butyl acetate. A solution of 24 parts of Desmodur-N-100 (Mobay Chemical Co.) in 15 parts of n-butyl acetate is added to the above mixture and the resulting formulation is applied by spraying to primed steel panels. The panels are baked at 110° C. for 16 minutes to obtain white coatings with excellent hardness, adhesion and solvent resistance.

EXAMPLE 5

Five (5) parts of caprolactone based hydroxy ester PCP-0300 (Union Carbide) and 2.7 parts of isophoronediisocyanate are included in the oligomer and isocyanate solutions respectively described in Example 1. The solutions are then mixed and the resulting formulation is applied to primed steel panels. The panels are baked at 110° C. for 18 minutes to obtain coatings with excellent physical properties.

EXAMPLE 6

Eight (8) parts of hydroxy polymer Acryloid OL-42 (Rohm and Haas Chemical Co.), three parts of adduct T1890 Hül Chemische Werke) and five parts of n-butyl acetate are added to the paint formulation described in Example 1. The resulting formulation is applied by spraying to primed steel panels which are baked at 105° C. for 17 minutes to obtain coatings with excellent hardness, adhesion, gloss and solvent (xylene and methyl ethyl ketone) resistance.

EXAMPLE 7

A hydroxy acrylic polymer ($\overline{M}_n = 2200$) is prepared by solution polymerization technique in methyl amyl ketone (60% solids by weight) comprising hydroxyethyl acrylate (30%), isobutyl methacrylate (45%) and styrene (25%).

Ten (10) parts of the above polymer solution, three parts of Desmodur-N-100 (Mobay Chemical Co.) and four parts of n-butyl acetate are included in the composition described in Example 2. The resulting formulation is applied by spraying to primed steel panels which are baked at 100° C. for 20 minutes to obtain coatings with excellent hardness, adhesion, gloss and solvent (xylene and methyl ethyl ketone) resistance.

EXAMPLE 8

Methylhexahydrophthalic anhydride (335 g), 2-ethyl-1,3-hexanediol (290 g) and diol RG-82 (Eastman Kodak Company) (285 g) are placed in round bottom flask and the mixture is heated at 80° C. for two hours. One gram of tetraisopropyl titanate (Tyzor TPT, E. I. du Pont de Nemours and Co.) is added to the reaction flask and is fitted with a Dean-Stark water separator. Xylene, 250 ml, is added to the reaction mixture and it is refluxed until no more water separated (9 hours).

Forty-nine (49) parts of the above oligomer and 0.5 parts of dibutyltin dilaurate are dissolved in 27 parts of n-butyl acetate. A solution of 46 parts of Desmodur-N-100 (Mobay Chemical Co.) in 18 parts of n-butyl acetate is added to the above solution and the resulting formulation is applied by spraying to primed steel panels. The panels are baked at 110° C. for 17 minutes to obtain coatings with excellent hardness, adhesion and solvent (xylene and methyl ethyl ketone) resistance.

EXAMPLE 9

A mixture of methylhexahydrophthalic anhydride (168 g), 2-ethyl-1,3-hexanediol (146 g) and 1,3-butanediol (90 g) is heated at 100° C. for two hours. One gram of tetraisopropyl titanate (Tyzro TPT, E. I. du Pont de Nemours and Co.) and 150 ml xylene are added to the above reaction mixture and it is refluxed under a Dean-Stark water separator. The refluxing is continued until no more water separated (6 hour).

Forty-eight (48) parts of the above oligomer and 0.5 part of dibutyltin dilaurate are dissolved in 29 parts of n-butyl acetate and 53 parts of Desmodur-N-100 (Mobay Chemical Co.) are added to it. The resulting formulation is applied by spraying to primed steel panels which are baked at 110° C. for 17 minutes to obtain coatings with excellent hardness, adhesion, gloss and solvent (xylene and methyl ethyl ketone) resistance.

EXAMPLE 10

Methylhexahydrophthalic anhydride (125 g) and 2-ethyl-1,3-hexanediol (109 g) are placed in a round bottom flask and stirred at 69° C. for 16 hours. Cordova Accelerator AMC TM-2 (125 g) (Cordova Chemical Company) is added to the reaction mixture followed by dropwise addition of 21 g glycidol; the reaction is stirred at 69° C. for one hour. Then 55 g of propylene oxide is added dropwise and the reaction mixture is stirred at 100° C. for three hours under a cold water condenser. Excess propylene oxide is evaporated under reduced pressure.

Twenty-four (24) parts of the above oligomer and 0.25 parts of dibutyltin dilaurate are dissolved in 14 parts of n-butyl stearate. A solution of 15 parts of Desmodur-N-100 (Mobay Chemical Co.) in 9 parts of n-butyl acetate is added to the above solution and the resulting formulation is applied by spraying to primed steel panels. The panels are baked at 110° C. for 17 minutes to obtain coatings with excellent hardness, adhesion, gloss and solvent resistance.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications comprising:
(A) a polyhydroxy oligomer having a number average molecular weight of between about 250–2000 and comprising the reaction product of:
 (i) an ester having pendant hydroxyl and carboxyl functionality and being made by reacting:
  (a) a $C_3$–$C_{10}$ aliphatic branched diol and
  (b) an alkyl hexahydrophthalic anhydride, wherein
   (a) and (b) are combined in the reactant mixture in an amount sufficient to allow reaction in about a 1:1 molar ratio; and
 (ii) a $C_2$–$C_{10}$ monomer, having reactive functionality capable of esterifying said carboxyl functionality of said ester, said $C_2$–$C_{10}$ monomer being selected from the group consisting of:
  (a) a monomer wherein said reactive functionality reacts with said carboxyl functionality to form an hydroxyl in addition to an ester linkage,
  (b) a monomer bearing hydroxyl functionality in addition to said reactive functionality and wherein said reactive functionality does not generate an hydroxyl in addition to an ester linkage, and
  (c) a monomer bearing hydroxyl functionality in addition to said reactive functionality wherein said reactive functionality reacts with said carboxyl functionality to form a hydroxyl in addition to an ester linkage,
 wherein said ester and said $C_2$–$C_{10}$ monomer are combined in the reactant mixture in an amount sufficient to allow reaction in about a 1:1 molar ratio;
(B) a polyisocyanate crosslinking agent; and
(C) 0–50 weight percent based on the total weight of (A), (B) and (C) of a hydroxy functional additive having a number average molecular weight ($\overline{M}_n$) of between about 150–6000,
 said polyisocyanate crosslinking agent having two or more reactive isocyanate groups per molecule and being included in the composition in an amount sufficient to provide between about 0.50 and about 1.6 reactive isocyanate groups per hydroxyl group present in said composition either on said polyhydroxy oligomer or as a hydroxyl group of said hydroxy functional additive.

2. A coating composition according to claim 1, wherein said aliphatic branched diol contains one primary hydroxyl group.

3. A coating composition according to claim 2 wherein the hydroxyl groups of said diol are not attached to adjacent carbon atoms.

4. A coating composition according to claim 3, wherein said diol is 2-ethyl-1,3-hexane diol.

5. A coating composition according to claim 1, wherein the alkyl group of said alkyl hexahydrophthalic anhydride comprises a lower alkyl group having up to about seven carbons.

6. A coating composition according to claim 4 or 5, wherein said anhydride is methyl hexahydrophthalic anhydride.

7. A coating composition according to claim 1, wherein said $C_2$–$C_{10}$ monomer is selected from the group consisting of:
(i) branched diols;
(ii) monoepoxides;
(iii) glycidyl esters;
(iv) glycidyl ethers; and
(v) mixtures of (ii)–(iv).

8. A coating composition according to claim 7, wherein said monomer is 2-ethyl-1,3-hexane diol.

9. A coating composition according to claim 1 or 7, wherein said polyhydroxy oligomer is a dihydroxy oligomer and said $C_2$–$C_{10}$ monomer is selected from the group consisting of:
(i) branched diols;
(ii) monoepoxides having no hydroxyl functionality;
(iii) glycidyl esters having no hydroxyl funtionality;
(iv) glycidyl ethers having no hydroxyl functionality; and
(v) mixtures of (ii)–(iv).

10. A coating composition according to claim 1, wherein said $C_3$–$C_{10}$ aliphatic branched diol and said $C_2$–$C_{10}$ monomer both are 2-ethyl-1,3-hexane diol and said anhydride is methyl hexahydrophthalic anhydride.

11. A coating composition according to claim 1, wherein said polyisocyanate crosslinking agent is included in said composition in an amount sufficient to provide between about 0.8 and about 1.3 reactive isocyanate groups per hydroxyl group in said composition.

12. A coating composition according to claim 1, wherein said polyisocyanate crosslinking agent is a diisocyanate.

13. A coating composition according to claim 1, wherein said polyisocyanate crosslinking agent had 3 or more reactive isocyanates per molecule.

14. A coating composition according to claim 13, wherein said polyisocyanate crosslinking agent is a trimerized product of an aliphatic diisocyanate.

15. A coating composition according to claim 14, wherein said polyisocyanate crosslinking agent is a trimerized reaction product of 1,6 hexamethylene diisocyanate.

16. A coating composition according to claim 13, wherein said polyisocyanate crosslinking agent is a polyisocyanate having a biuret structure.

17. A composition according to claim 1 or 10, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)–(iv).

18. A composition according to claim 1, wherein said composition further comprises 0–15 weight percent based on the total weight of said composition of a flow control additive.

19. A high solids coating composition which contains greater than about 60 percent by weight nonvolatile solids and which except for pigments, solvents and other nonreactive components, consists essentially of:
(A) a polyhydroxy oligomer having a number average molecular weight of between about 250–2000 and comprising the reaction product of:
 (i) an ester having pendant hydroxyl and carboxyl functionality and being made by reacting:
  (a) a $C_3$–$C_{10}$ aliphatic branched diol and
  (b) an alkyl hexahydrophthalic anhydride, wherein (a) and (b) are combined in the reactant mixture in an amount sufficient to allow reaction in at least about a 1:1 molar ratio; and
 (ii) a $C_2$–$C_{10}$ monomer, having reactive functionality capable of esterifying said carboxyl functionality of said ester, said $C_2$–$C_{10}$ monomer being selected from the group consisting of:
  (a) a monomer wherein said reactive functionality reacts with said carboxyl functionality to form an hydroxyl in addition to an ester linkage,
  (b) a monomer bearing hydroxyl functionality in addition to said reactive functionality and wherein said reactive functionality does not generate an hydroxyl in addition to an ester linkage, and
  (c) a monomer bearing hydroxyl functionality in addition to said reactive functionality wherein said reactive functionality acts with said carboxyl functionality to form a hydroxyl in addition to an ester linkage,
 wherein said ester and said $C_2$–$C_{10}$ monomer are combined in the reactant mixture in an amount sufficient to allow reaction in about a 1:1 molar ratio;
(B) a polyisocyanate crosslinking agent;
(C) 0–50 weight percent based on the total weight of (A), (B), (C) and (D) of a hydroxy functional additive having a number average molecular weight ($\overline{M}_n$) of between about 150–6000; and
(D) up to 15 weight percent based on the total weight of (A), (B), (C) and (D) of a flow control additive
said polyisocyanate crosslinking agent being included in the composition in an amount sufficient to provide at least about 0.60 equivalents of nitrogen crosslinking functionality for each equivalent of hydroxyl functionality included in said composition either on said polyhydroxy oligomer or as a hydroxyl group of said hydroxy functional additive.

20. A high solids coating composition according to claim 19, wherein said aliphatic branched diol contains one primary hydroxyl group.

21. A high solids coating composition according to claim 20, wherein the hydroxyl groups of said diol are not attached to adjacent carbon atoms.

22. A high solids coating composition according to claim 21, wherein said diol is 2-ethyl-1,3-hexane diol.

23. A high solids coating composition according to claim 20, wherein the alkyl group of said alkyl hexahydrophthalic anhydride comprises a lower alkyl group having up to about seven carbons.

24. A high solids coating composition according to claim 22 or 23 wherein said anhydride is methyl hexahydrophthalic anhydride.

25. A high solids coating composition according to claim 19, wherein said $C_2$–$C_{10}$ monomer is selected from the group consisting of:
 (i) branched diols;
 (ii) monoepoxides;
 (iii) glycidyl esters;
 (iv) glycidyl ethers; and
 (v) mixtures of (ii)–(iv).

26. A high solids coating composition according to claim 25, wherein said monomer is 2-ethyl-1,3-hexane diol.

27. A high solids coating composition according to claim 19 or 25, wherein said polyhydroxy oligomer is a dihydroxy oligomer and said $C_2$–$C_{10}$ monomer is selected from the group consisting of:
 (i) branched diols;
 (ii) monoepoxides having no hydroxy functionality;
 (iii) glycidyl esters having no hydroxyl functionality;
 (iv) glycidyl ethers having no hydroxyl functionality; and
 (v) mixtures of (ii) and (iv).

28. A high solids coating composition according to claim 19, wherein said $C_3$–$C_{10}$ aliphatic branched diol and said $C_2$–$C_{10}$ monomer both are 2-ethyl-1,3-hexane diol and said anhydride is methyl hexahydrophthalic anhydride.

29. A high solids coating composition according to claim 19, wherein said polyisocyanate crosslinking agent is included in said composition in an amount sufficient to provide between about 0.8 and about 1.3 reactive isocyanate groups per hydroxyl group in said composition.

30. A high solids coating composition according to claim 19, wherein said polyisocyanate crosslinking agent is a diisocyanate.

31. A high solids coating composition according to claim 19, wherein said polyisocyanate crosslinking agent has 3 or more reactive isocyanates per molecule.

32. A high solids coating composition according to claim 31, wherein said polyisocyanate crosslinking agent is a trimerized product of an aliphatic diisocyanate.

33. A high solids coating composition according to claim 19 or 28, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)–(iv).

* * * * *